(12) United States Patent
Craig et al.

(10) Patent No.: US 10,465,701 B2
(45) Date of Patent: *Nov. 5, 2019

(54) VARIABLE PITCH FAN BLADE SYSTEM

(71) Applicant: UNITED TECHNOLOGIES CORPORATION, Farmington, CT (US)

(72) Inventors: Colin D. Craig, West Hartford, CT (US); Leslie Charles Kurz, Hebron, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/494,255

(22) Filed: Apr. 21, 2017

(65) Prior Publication Data

US 2018/0306201 A1    Oct. 25, 2018

(51) Int. Cl.
| | |
|---|---|
| *B63H 1/20* | (2006.01) |
| *F04D 29/36* | (2006.01) |
| *F01D 7/00* | (2006.01) |
| *F01D 17/16* | (2006.01) |
| *F02K 3/06* | (2006.01) |

(Continued)

(52) U.S. Cl.
CPC ............... *F04D 29/36* (2013.01); *F01D 7/00* (2013.01); *F01D 17/162* (2013.01); *F02K 3/06* (2013.01); *F04D 29/056* (2013.01); *F04D 29/323* (2013.01); *F04D 29/329* (2013.01); *F04D 29/644* (2013.01); *F05D 2220/32* (2013.01); *F05D 2220/36* (2013.01);

(Continued)

(58) Field of Classification Search
CPC ........ F01D 5/30; F01D 5/3038; F01D 5/3046; F04D 29/322; F04D 29/34
USPC ................ 416/127, 204, 205, 206, 212, 215
See application file for complete search history.

(56) References Cited

U.S. PATENT DOCUMENTS

| | | | |
|---|---|---|---|
| 3,549,272 A | 12/1970 | Bauger et al. | |
| 3,895,884 A | 7/1975 | Andrews | |

(Continued)

FOREIGN PATENT DOCUMENTS

| | | |
|---|---|---|
| EP | 3109481 | 12/2016 |
| FR | 2218241 | 9/1974 |
| GB | 1324385 | 7/1973 |

OTHER PUBLICATIONS

European Patent Office, European Search Report dated Sep. 17, 2018 in Application No. 18168146.1-1006.

*Primary Examiner* — John Kwon
(74) *Attorney, Agent, or Firm* — Snell & Wilmer L.L.P.

(57) ABSTRACT

A gas turbine engine may have a fan section that includes a variable pitch mechanism for changing the pitch of fan blades. The gas turbine engine may include a fan hub that is rotatable about an engine central longitudinal axis of the gas turbine engine and a blade receiver that is for holding a fan blade and that is rotatably coupled to the fan hub and may be rotatable about a radial axis of the gas turbine engine. The gas turbine engine may include a spring element disposed between the fan hub and the blade receiver to bias the blade receiver radially outward and an annular retaining ring may be disposed around the radial axis and between the fan hub and the blade receiver to limit radially outward movement of the blade receiver to prevent the blade receiver from decoupling and disengaging from the fan hub.

20 Claims, 4 Drawing Sheets

(51) Int. Cl.
*F04D 29/32* (2006.01)
*F04D 29/056* (2006.01)
*F04D 29/64* (2006.01)

(52) U.S. Cl.
CPC ...... *F05D 2260/30* (2013.01); *F05D 2260/52* (2013.01); *F05D 2260/74* (2013.01); *F05D 2260/98* (2013.01)

(56) References Cited

U.S. PATENT DOCUMENTS

| | | | | |
|---|---|---|---|---|
| 4,219,310 | A | * | 8/1980 | Takata .................... F04D 29/36 416/146 A |
| 4,630,999 | A | * | 12/1986 | De La Harpe ............ F01D 7/00 416/147 |
| 4,850,801 | A | * | 7/1989 | Valentine ................ B64C 11/06 416/205 |
| 4,863,352 | A | * | 9/1989 | Hauser .................... B64C 11/06 416/204 R |
| 4,968,217 | A | | 11/1990 | Newton |
| 5,009,570 | A | * | 4/1991 | Richardson ......... F04D 29/0413 415/174.2 |
| 5,118,256 | A | * | 6/1992 | Violette ................. B64C 11/06 416/134 R |
| 5,405,244 | A | * | 4/1995 | Boyd .................... F01D 5/3069 416/214 A |
| 6,015,264 | A | * | 1/2000 | Violette ................. B64C 11/06 384/517 |
| 2011/0129345 | A1 | | 6/2011 | Towkan |
| 2016/0376919 | A1 | | 12/2016 | Miller et al. |
| 2018/0306039 | A1 | * | 10/2018 | Kurz ....................... B64C 11/32 |

* cited by examiner

VARIABLE PITCH FAN BLADE SYSTEM

FIELD

The present disclosure relates to gas turbine engines, and more specifically, variable pitch fan blades of gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Some gas turbine engines may have a variable pitch fan blade configuration that enables the fan blades to be rotated about their respective radial axes to change the angle of attack of the fan blades.

SUMMARY

In various embodiments, the present disclosure provides a gas turbine engine that includes a fan hub, a blade receiver, a spring element, and an annular retaining ring. The fan hub, according to various embodiments, is rotatable about an engine central longitudinal axis of the gas turbine engine. The blade receiver is for holding a fan blade and the blade receiver is rotatably coupled to the fan hub and rotatable about a radial axis of the gas turbine engine, according to various embodiments. The spring element is disposed between the fan hub and the blade receiver and the spring element is biased to exert a radially outward force against the blade receiver, according to various embodiments. The annular retaining ring, according to various embodiments, is disposed around the radial axis and disposed between the fan hub and the blade receiver. The annular retaining ring may be configured to limit radially outward movement of the blade receiver to prevent the blade receiver from decoupling and disengaging from the fan hub.

In various embodiments, the annular retaining ring is circumferentially segmented. For example, the annular retaining ring may include a plurality of circumferential segments. In various embodiments, the gas turbine engine further includes a bearing disposed between the fan hub and the blade receiver. In various embodiments, the annular retaining ring is in direct engagement with the blade receiver. The direct engagement between the annular retaining ring and the blade receiver may be more than a point contact. In various embodiments, the annular retaining ring is in direct engagement with the fan hub.

In various embodiments, the gas turbine engine further includes a variable pitch mechanism having an actuation arm coupled to the blade receiver. A splined index ring may be coupled between the actuation arm of the variable pitch mechanism and the blade receiver. The annular retaining ring, according to various embodiments, is in direct engagement with the actuation arm of the variable pitch mechanism. In various embodiments, the spring element is positioned radially outward of the annular retaining ring. In various embodiments, the spring element has a wear coating. In various embodiments, the spring element is self-lubricating. In various embodiments, the spring element includes a wave spring that extends around the radial axis.

Also disclosed herein, according to various embodiments, is a method of assembling a gas turbine engine. The method may include positioning a spring element between a fan hub and a blade receiver. The method may further include compressing the spring element to enlarge an annular gap between the fan hub and the blade receiver. Still further, the method may include inserting a circumferential segment of a segmented annular retaining ring through the annular gap.

In various embodiments, inserting the circumferential segment through the annular gap is performed after compressing the spring element and while the annular gap is enlarged. In various embodiments, compressing the spring element includes moving the blade receiver radially inward. In various embodiments, the circumferential segment is one of a plurality of circumferential segments of the segmented annular retaining ring, wherein inserting the circumferential segment comprises individually inserting each circumferential segment of the plurality of circumferential segments through the annular gap to form the segmented annular retaining ring. In various embodiments, the method further includes positioning a splined index ring between the blade receiver and an actuation arm of a variable pitch mechanism after individually inserting each circumferential segment of the plurality of circumferential segments through the annular gap.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
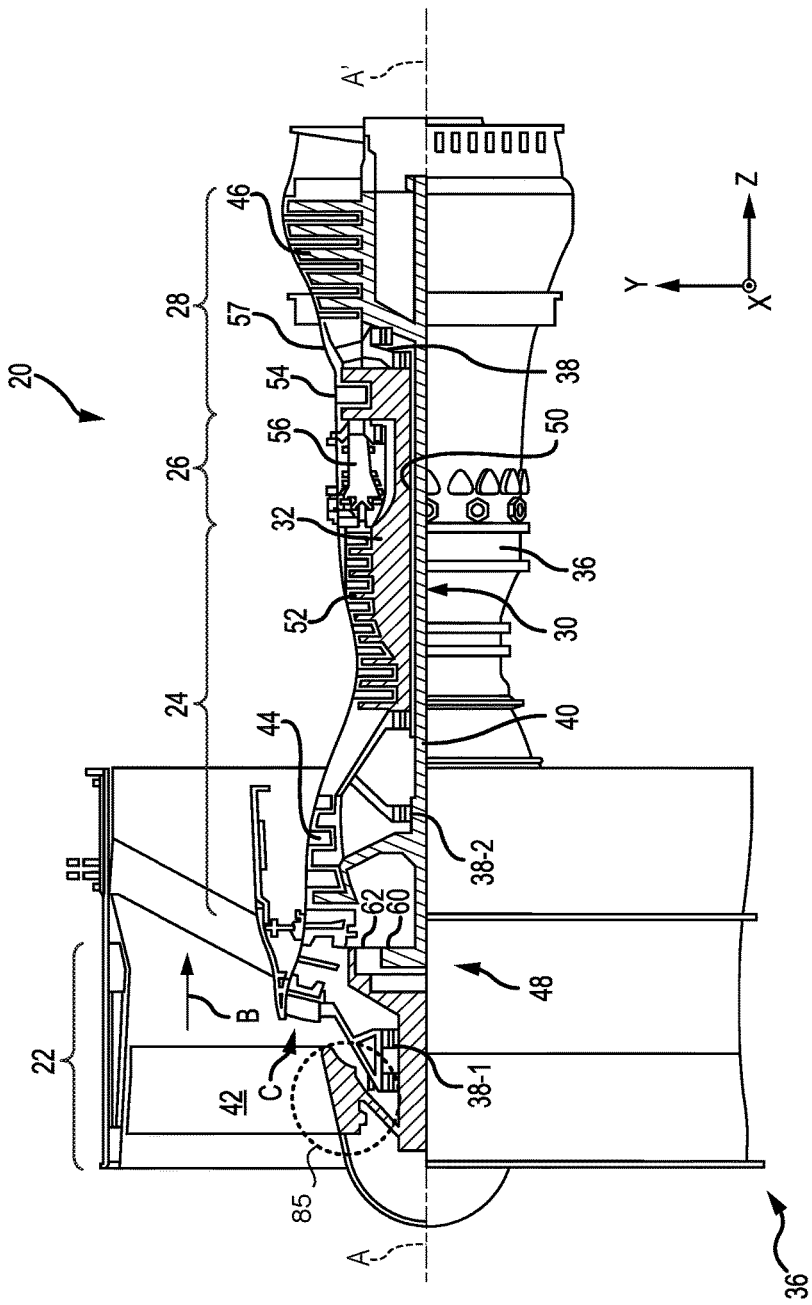
FIG. 1 illustrates a cross-sectional view of a gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
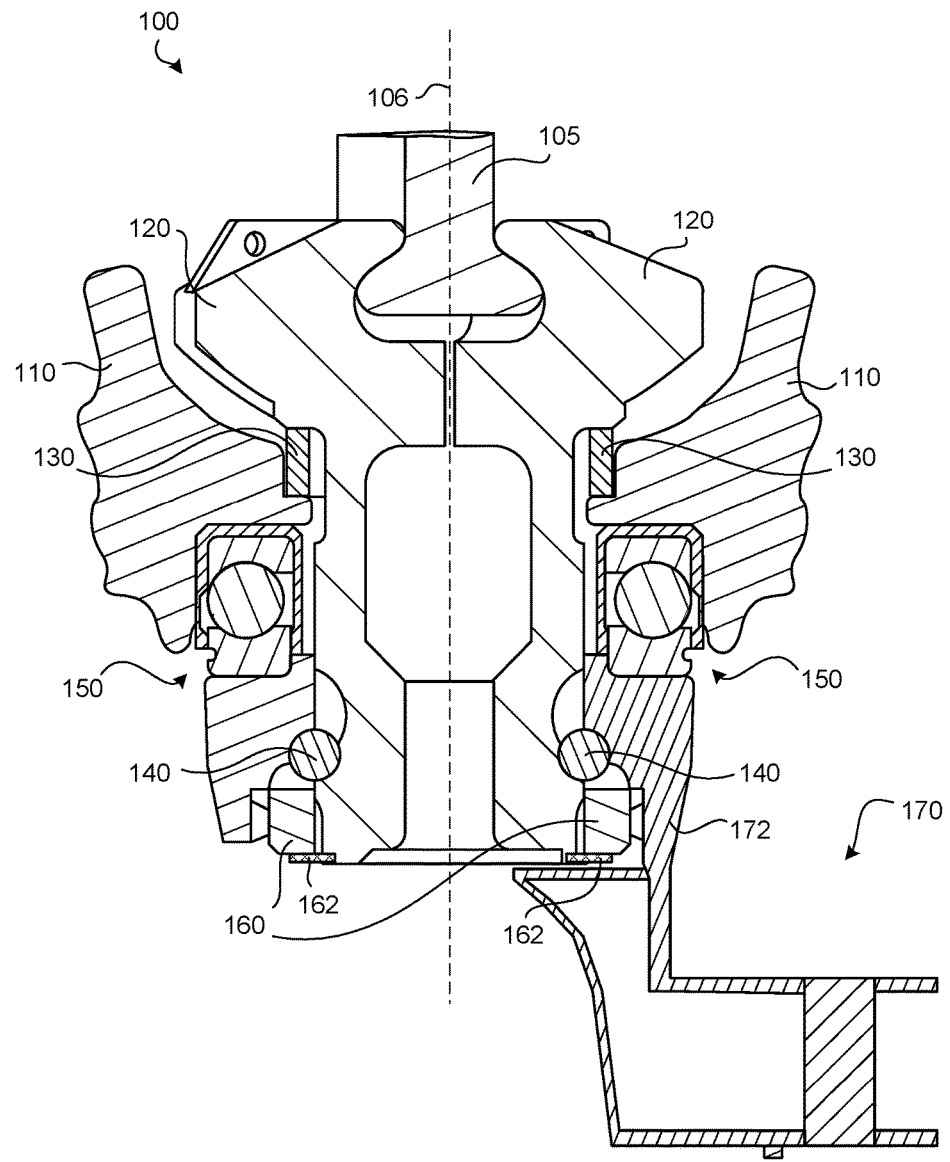
FIG. 2 illustrates a cross-sectional view of a variable pitch fan blade system, in accordance with various embodiments.

The fan section 22 of the gas turbine engine 20 may have a variable pitch fan blade system 100, according to various embodiments and with reference to FIG. 2. The variable pitch fan blade system 100 depicted in FIG. 2 is a cross-sectional view of area 85 generally indicated in FIG. 1. The variable pitch fan blade system 100 is generally configured to enable rotation of fan blades about their respective centerline axes (referred to herein as "radial axes" 106 because the fan blades 105 generally extend radially outward from the engine central longitudinal axis A-A' of the gas turbine engine 20). Changing the pitch of the fan blades 105, also referred to as changing the angle of attack of the fan blades 105, affects the flow of air through the gas turbine engine 20.

The variable pitch fan blade system 100 of the present disclosure provides an alternative and improved structure and assembly for radially retaining the fan blades.

In various embodiments, the gas turbine engine 20 includes a fan hub 110, a blade receiver 120 for holding a fan blade 105, a spring element 130, and an annular retaining ring 140. The fan hub 110 is rotatable about the engine central longitudinal axis A-A' of the gas turbine engine 20 and the blade receiver 120 is rotatable about the radial axis 106 (e.g., centerline axis of the fan blade 105), according to various embodiments. Said differently, the blade receiver 120 may be rotatably coupled to the fan hub 110 or may within a channel defined by the fan hub 110. The spring element 130 is disposed between the fan hub 110 and the blade receiver 120 and is biased to exert a radially outward force against the blade receiver 120, according to various embodiments. The annular retaining ring 140 may be disposed around the radial axis 106 and may be disposed between the fan hub 110 and the blade receiver 120. The annular retaining ring 140 is generally configured to limit radially outward movement of the blade receiver 120, thereby preventing the blade receiver 120 from decoupling and/or disengaging from the fan hub 110, according to various embodiments.

In various embodiments, the gas turbine engine 20 further includes a variable pitch mechanism 170 having an actuation arm 172 that is coupled to the blade receiver 120 to control and actuate the pitch adjustments of the fan blades 105 via the fan blade receiver 120. In various embodiments, a splined index ring 160 may be coupled between the actuation arm 172 of the variable pitch mechanism 170 and the blade receiver 120. The splined index ring 160 may be secured in place via a retaining ring 162 which is assembled onto the blade receiver 120.

In various embodiments, one or more bearings 150 may be disposed between the fan hub 110 and the blade receiver 120 to enable relative rotation between the fan hub 110 and the blade receiver 120. In various embodiments, the one or more bearings 150 may be disposed between the fan hub 110 and the actuation arm 172 of the variable pitch mechanism 170 to enable relative rotation between the fan hub 110 and the actuation arm 172.

In various embodiments, and with continued reference to FIG. 2, the spring element 130 and the annular retaining ring 140 rotate with the blade receiver 120 about the radial axis 106. Though not having substantial bearing functionality with respect to the rotation of the blade receiver 120 about the radial axis 106 within the confines of the fan hub 110, the spring element 130 and the annular retaining ring 140 may still experience some degree of relative rotation with the adjacent structures (e.g., the blade receiver 120, the fan hub 110, and/or the actuation arm 172 of the variable pitch mechanism 170). Accordingly, the spring element 130 and/or the annular retaining ring 140 may have a wear coating and/or may be made of a self-lubricating material.

In various embodiments, the annular retaining ring 140 cooperates with the spring element 130 to radially retain the blade receiver 120. Said differently, the biased spring element 130 may exert a radially outward force on the blade receiver 120 and the annular retaining ring 140 may counter the radially outward force. In various embodiments, the radially outward force created by the spring element 130 prevents the blade receiver 120 from falling radially inwards, for example when the fan hub 110 is not rotating around the central longitudinal axis A-A' of the gas turbine engine 20 and thus there is no centrifugal load on the blade receiver 120. In various embodiments, the annular retaining ring 140 prevents or at least limits movement of the blade receiver 120 in the opposite (i.e., radially outward) direction, thereby preventing the blade receiver 120 from decoupling and disengaging from the fan hub 110.

In various embodiments, the spring element 130 is a wave spring that extends around the blade receiver. In various embodiments, the spring element 130 may include one or more helical coil springs that are configured to exert the radially outward force on the blade receiver 120. The annular retaining ring 140 may be segmented and thus may have discrete circumferential segments that are detachable from each other. Forming the annular retaining ring 140 from a plurality of circumferential segments may enhance the ease of assembling the variable pitch fan blade system 100. Additional details pertaining to the annular retention ring and how it is installed and/or assembled are included below with reference to FIGS. 3, 4A, and 4B.

Figure 3:
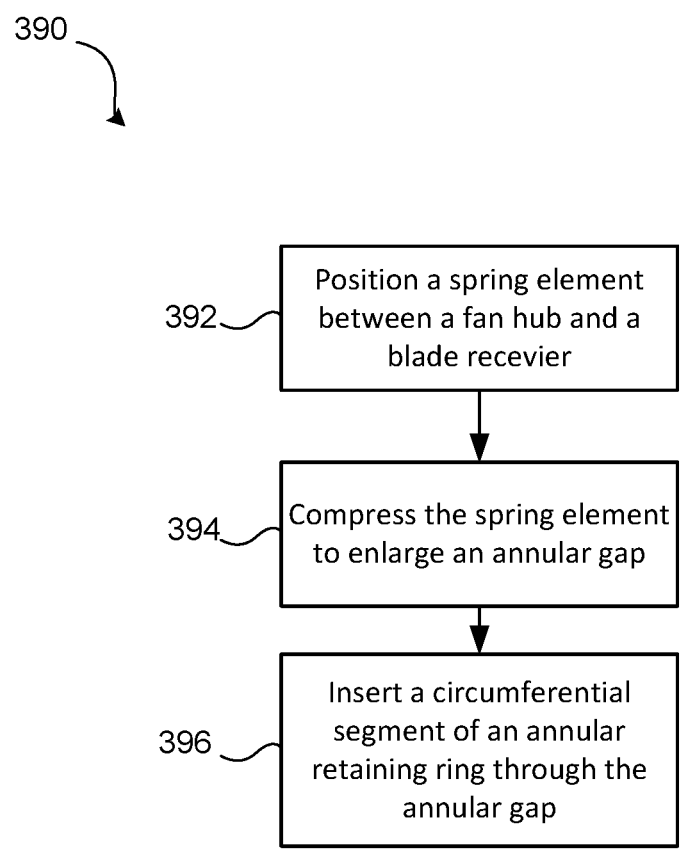
FIG. 3 is a schematic flow chart diagram of a method of assembling a gas turbine engine, in accordance with various embodiments.

In various embodiments, and with reference to FIG. 3, a method 390 of assembling a gas turbine engine is provided. The method 390 may include positioning the spring element 130 between the fan hub 110 and the blade receiver 120 at step 392. The method 390 may further include compressing the spring element 130 to enlarge an annular gap 125 (see FIG. 4A) at step 394. In various embodiments, the annular gap 125 is defined between the fan hub 110 and the blade receiver 120. With the annular gap 125 enlarged, the method 390 may include inserting individual circumferential segments through the annular gap at step 396. The method 390 may further include positioning and orienting the circumferential segments so as to form the annular retaining ring 140 in the desired position/location between the fan hub 110 and the blade receiver 120.

Figure 4A:
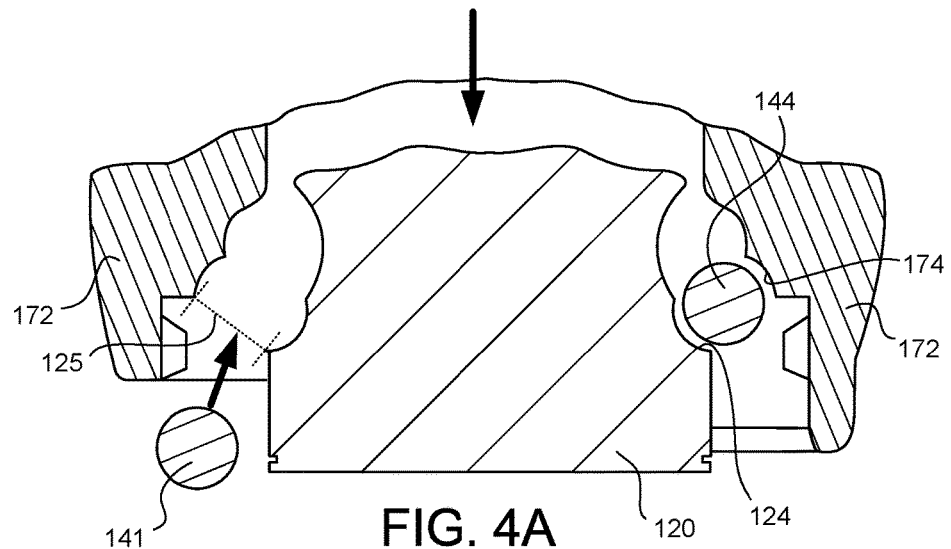
FIG. 4A illustrates a schematic cross-sectional view of a variable pitch fan blade system of a gas turbine engine being assembled, in accordance with various embodiments.

In various embodiments, and with reference to FIG. 4A, step 394 of the method 390 is provided and shown. FIG. 4A shows a partial view of the variable pitch fan blade system 100. Said differently, FIG. 4A, according to various embodiments, depicts the radially inward portion of the blade receiver 120 and depicts pertinent portions of the actuation arm 172 of the variable pitch mechanism 170. Step 394 of the method 390 includes compressing the spring element 130, which moves the blade receiver 120 in a radially inward direction and enlarges the annular gap 125 between the blade receiver 120 and the actuation arm 172 of the variable pitch mechanism 170. In response to the annular gap 125 being enlarged, circumferential segments of the annular retaining ring 140 may be individually inserted through the annular gap 125 and the annular retaining ring 140 may be reassembled in the desired location between the blade receiver 120 and the fan hub 110 and/or the actuation arm 172. In response to the annular retaining ring 140 being properly formed and positioned, the compression force causing the spring element 130 to compress may be released, thereby causing the blade receiver 120 to move in a radially outward direction due by the radially outward force exerted by the spring element 130.

Figure 4B:
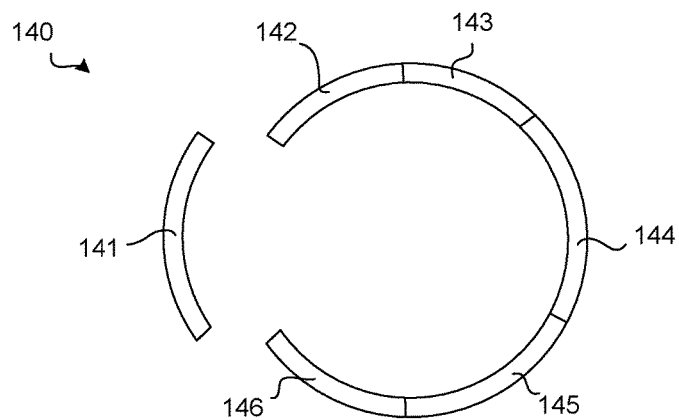
FIG. 4B illustrates a segmented annular retaining ring, in accordance with various embodiments.

In various embodiments, and with reference to FIG. 4B, the annular retaining ring 140 is provided having multiple circumferential segments 141, 142, 143, 144, 145, 146. While FIG. 4B shows the annular retaining ring 140 having six circumferential segments 141, 142, 143, 144, 145, 146, the annular retaining ring 140 may be divided into a different number of segments (e.g., 4, 8, 12, etc.). In various embodiments, the number of circumferential segments is dependent on the size of the annular gap 125 and the features and orientation of the adjacent components.

In various embodiments, the annular retaining ring 140 is made from a metallic material. For example, the annular retaining ring 140 may be made from stainless steel. In various embodiments, the blade receiver 120 and the actuation arm 172 of the variable pitch mechanism 170 annular have mating surfaces 124, 174, respectively, that are configured to match the cross-sectional shape of the annular retaining ring 140. In such embodiments, the direct engagement between the annular retaining ring 140 and the respective mating surfaces 124, 174 is more than a point contact. The term "more than a point contact" refers to direct mechanical contact between workpieces in which the contact interface between the two workpieces is a line or an area (e.g., more than a point). This increased contact area, as compared to an interface that is a single point (e.g., a ball bearing against a raceway), between two workpieces (e.g., between the annular retaining ring 140 and the blade receiver 120) has a higher load capacity. Said differently, direct engagement between the annular retaining ring 140 and the blade receiver 120 may comprise a line engagement or an area engagement that provide sufficient contact area for transferring loads during, for example, operating of the fan section 22 of the gas turbine engine 20. Accordingly, in various embodiments, the annular retaining ring 140 is made from a material that has high shear/transverse strength properties.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
   a fan hub rotatable about an engine central longitudinal axis of the gas turbine engine;
   a blade receiver for holding a fan blade, the blade receiver rotatably coupled to the fan hub and rotatable about a radial axis of the gas turbine engine;
   a spring element disposed between the fan hub and the blade receiver, the spring element being biased to exert a radially outward force against the blade receiver; and
   an annular retaining ring disposed around the radial axis and disposed between the fan hub and the blade receiver, the annular retaining ring configured to limit radially outward movement of the blade receiver.

2. The gas turbine engine of claim 1, wherein the annular retaining ring is circumferentially segmented.

3. The gas turbine engine of claim 2, wherein the annular retaining ring comprises a plurality of circumferential segments that are detachable from each other.

4. The gas turbine engine of claim 1, further comprising a bearing disposed between the fan hub and the blade receiver.

5. The gas turbine engine of claim 1, wherein the annular retaining ring is in direct engagement with the blade receiver.

6. The gas turbine engine of claim 5, wherein the direct engagement between the annular retaining ring and the blade receiver is more than point contact.

7. The gas turbine engine of claim 5, wherein the annular retaining ring is in direct engagement with the fan hub.

8. The gas turbine engine of claim 1, further comprising a variable pitch mechanism having an actuation arm coupled to the blade receiver.

9. The gas turbine engine of claim 8, further comprising a splined index ring coupled between the actuation arm of the variable pitch mechanism and the blade receiver.

10. The gas turbine engine of claim 8, wherein the annular retaining ring is in direct engagement with the actuation arm of the variable pitch mechanism.

11. The gas turbine engine of claim 1, wherein the spring element is positioned radially outward of the annular retaining ring.

12. The gas turbine engine of claim 1, wherein the spring element comprises a wear coating.

13. The gas turbine engine of claim 1, wherein the spring element is self-lubricating.

14. The gas turbine engine of claim 1, wherein the spring element comprises a wave spring that extends around the radial axis.

15. A gas turbine engine comprising:
- a fan hub rotatable about an engine central longitudinal axis of the gas turbine engine;
- a blade receiver for holding a fan blade, the blade receiver rotatably coupled to the fan hub and rotatable about a radial axis of the gas turbine engine;
- a bearing disposed between the fan hub and the blade receiver;
- a spring element disposed between the fan hub and the blade receiver, the spring element being biased to exert a radially outward force against the blade receiver;
- a segmented annular retaining ring in direct engagement with the blade receiver, disposed around the radial axis, and disposed between the fan hub and the blade receiver, the segmented annular retaining ring configured to limit radially outward movement of the blade receiver to prevent the blade receiver from decoupling and disengaging from the fan hub, wherein the segmented annular retaining ring comprises a plurality of circumferential segments; and
- a variable pitch mechanism having an actuation arm coupled to the blade receiver, wherein the segmented annular retaining ring is in direct engagement with the actuation arm of the variable pitch mechanism.

16. A method of assembling a gas turbine engine, the method comprising:
- positioning a spring element between a fan hub and a blade receiver;
- compressing the spring element to enlarge an annular gap between the fan hub and the blade receiver; and
- inserting a circumferential segment of a segmented annular retaining ring through the annular gap.

17. The method of claim 16, wherein inserting the circumferential segment through the annular gap is performed after compressing the spring element and while the annular gap is enlarged.

18. The method of claim 16, wherein compressing the spring element comprises moving the blade receiver radially inward.

19. The method of claim 16, wherein the circumferential segment is one of a plurality of circumferential segments of the segmented annular retaining ring, wherein inserting the circumferential segment comprises individually inserting each circumferential segment of the plurality of circumferential segments through the annular gap to form the segmented annular retaining ring.

20. The method of claim 19, further comprising positioning a splined index ring between the blade receiver and an actuation arm of a variable pitch mechanism after individually inserting each circumferential segment of the plurality of circumferential segments through the annular gap.

* * * * *